Oct. 23, 1951 C. W. SUNDBERG 2,572,214
SLED
Filed March 7, 1947 3 Sheets-Sheet 1

INVENTOR.
CARL W. SUNDBERG
BY Arthur M. Smith
ATTORNEY

Oct. 23, 1951   C. W. SUNDBERG   2,572,214
SLED
Filed March 7, 1947   3 Sheets-Sheet 2
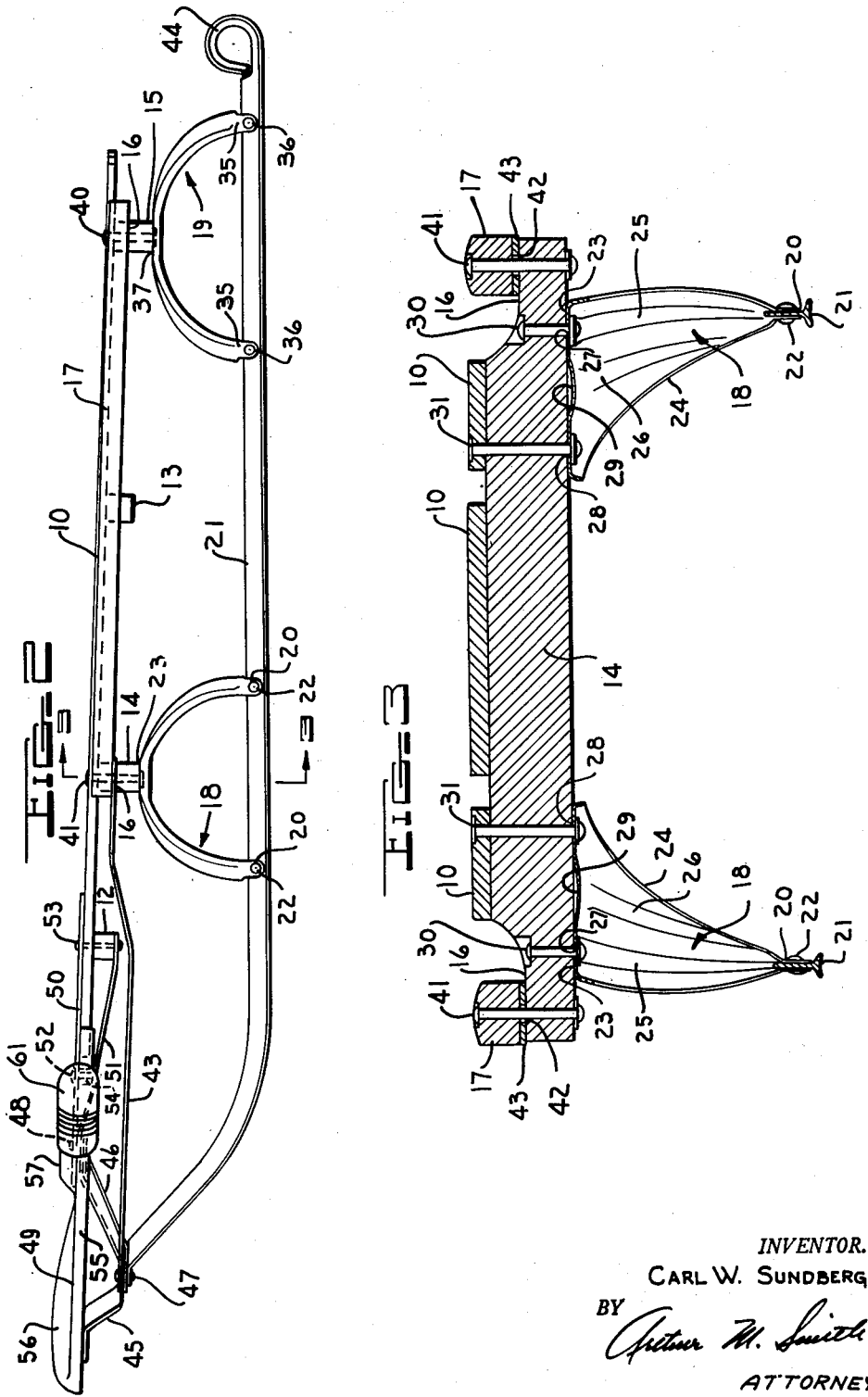
INVENTOR.
CARL W. SUNDBERG
BY
Arthur M. Smith
ATTORNEY

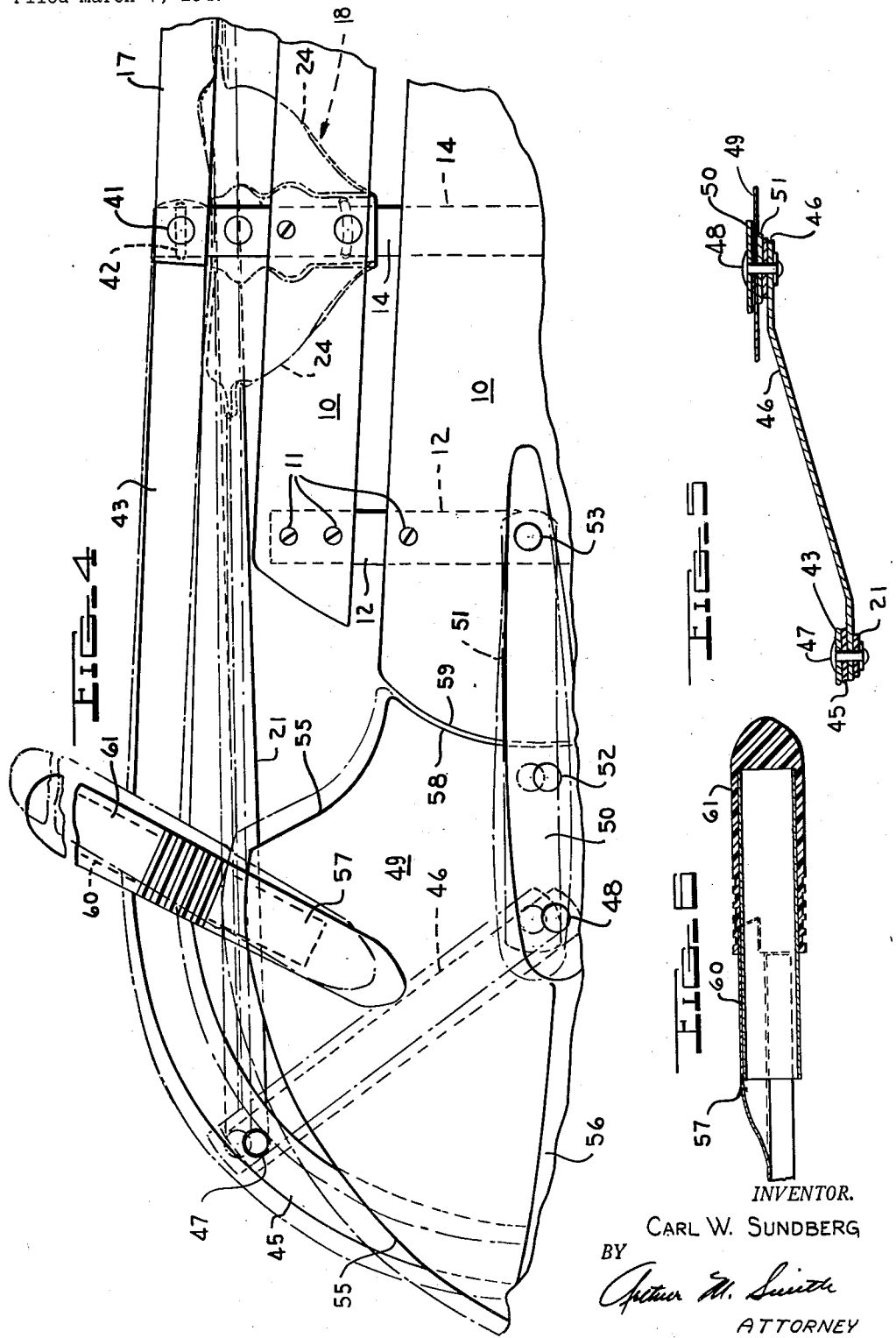

Patented Oct. 23, 1951

2,572,214

UNITED STATES PATENT OFFICE 2,572,214

SLED

Carl W. Sundberg, Birmingham, Mich., assignor to Pratt Manufacturing Company, Coldwater, Mich., a copartnership Application March 7, 1947, Serial No. 732,945

2 Claims. (Cl. 280—22)

1

The present invention relates to new and useful improvements in safety coasting sleds and in particular to sleds of the type which are steered by lateral bending or flexing of the runners.

Primary objects of the present invention are:

(1) To provide improvements in a safety sled structure whereby a sturdy lightweight and rugged construction is combined with a graceful streamlined appearance, achieving at the same time economies in manufacture and optimum efficiency in operation;

(2) To provide in a safety sled having laterally flexible runners, a simplified and improved steering mechanism which will permit sturdy construction by minimizing slidable couplings, and which assures ease of operation and responsiveness to the steering control as compared to the steering mechanism of similar sled types;

(3) To provide a lightweight snow shield, integral with the steering mechanism, and adapted to protect the person riding on the sled from snow and ice spray; and (4) To provide an improved sled knee construction which is cooperable with the steering mechanism to minimize steering effort and which affords lightweight structure particularly adapted to withstand the stress and abuse normally received by a child's toy.

Other objects of this invention will appear in the following description and appended claims, reference being had to the accompanying drawings forming a part of this specification wherein like reference characters designate corresponding parts in the several views.

In the drawings:

Fig. 2 is essentially a side elevation of the sled shown in Fig. 1.

Fig. 3 is an enlarged vertical section through the forward knees and bench and taken in the direction of the arrows essentially along the line 3—3 of Fig. 2.

Fig. 4 is an enlarged fragmentary plan view showing a portion of the sled in Fig. 1 with the runner in a flexed position for steering to the left, the unflexed position being shown in phantom.

Fig. 5 is an enlarged fragmentary section taken in the direction of the arrows essentially along the line 5—5 of Fig. 1, showing the linkage which connects the runners with the snow shield.

Fig. 6 is an enlarged fragmentary section through the steering bar, taken in the direction of the arrows essentially along the line 6—6 of Fig. 1.

Figure 1:
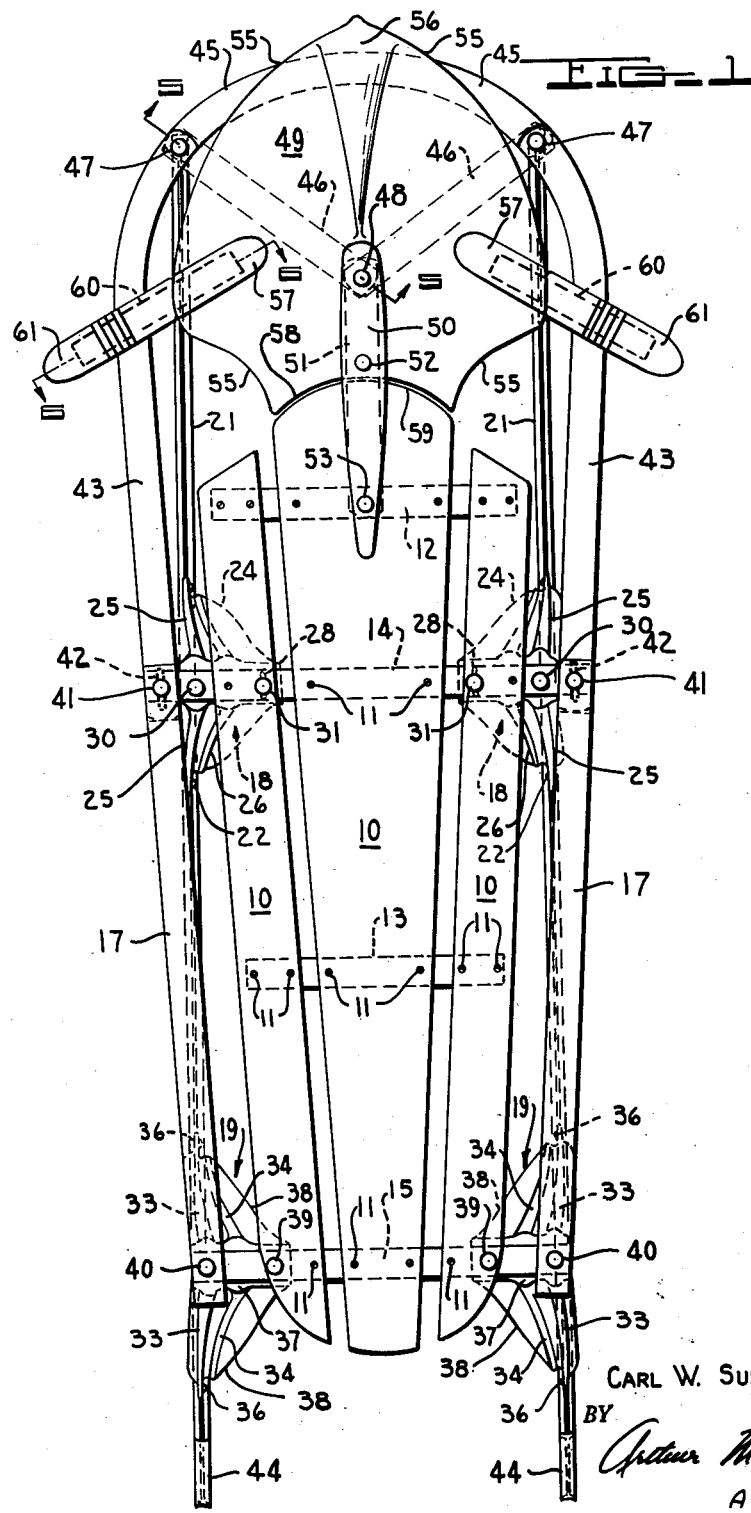
Fig. 1 is a plan view of a sled embodying the present invention.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A sled employing a particular embodiment of the present invention is shown by way of example in the drawings wherein the deck 10, which may comprise a single broad back piece if desired, is comprised of a plurality of slats secured in proper relation to each other as a rigid unit by the plurality of screws 11 to the transverse braces 12 and 13 and the transverse benches 14 and 15, Fig. 1. The lateral upper portions of the benches 14 and 15 are cut away to provide seats 16, Fig. 3, for the pair of side rails 17 which extend along the sides of the deck 10 at substantially the same level therewith, essentially from the forward knees to the rearward knees which are indicated generally by the numerals 18 and 19 respectively, Figs. 1 and 2.

The forward knees 18 are preferably sheet metal stampings, each formed into arches having the two slotted footings 20 rigidly secured to the laterally flexible paired runners 21 by the rivets 22. The crest of each arched knee 18 is flattened and extended inward to comprise the bench seat 23, which latter is braced by the arched inner edges 24 of the knee 18 which extend downwardly and outwardly toward the two footings 20 from the innermost portion of the bench seat 23. The particular type of arch structure of the present invention readily lends itself to reinforcement by a corrugated effect, which in the present instance is shown by the ribs 25 and 26 formed in the knee 18 and extending in either direction essentially from the crest of the arch to the footings 20, Figs. 1 and 3. Thus the knee may be constructed of relatively lightweight material and yet be sufficiently strong to withstand the normal abuse of coasting and sliding. Other reinforcing formed rib structures may be utilized to satisfy particular requirements.

Each bench seat 23 provides the outer pivot hole 27 and the arcuate inner slot 28 which is concentric with the pivot hole 27. The portion 29 of the bench seat 23, between the pivot hole 27 and slot 28, is depressed from the adjacent bench 14, thereby providing a reinforcing rib to stiffen the sheet metal seat 23 and minimizing the area of friction contact thereof with the bench 14. Thus the knee 18 may be pivotally secured to the bench 14, as by the rivet 30 in the pivot hole 27 for example. Pivotal movement of the knee 18 about the rivet 30 is limited by the rivet 31 which extends within the arcuate slot 28 and secures the inner portion of the seat 23 to the bench 14.

The pair of arched rear knees 19 are also preferably formed of sheet metal stampings similarly to the forward knees 18 and are reinforced by the rib-corrugations 33 and 34. The slotted footings 35 of the knees 19 are secured to the runners 21 by the rivets 36. A bench seat 37 is formed by the flattened portion at the crest of each arched knee 19, the innermost portion thereof being braced by the arched inner edge 38 of the knee 19 and being secured to the bench 15 by the rivet 39. A rivet 40 rigidly secures the outer portion of each bench seat 37 with the bench 15 and corresponding side rail 17 on opposite sides of the sled.

The forward portion of each side rail 17 is secured to its respective seat 16, as by a rivet 41, which also extends through an elongated pivot opening 42 within the rearward end of the corresponding link 43, securing the rail 17, link 43, and bench 14 together, yet without binding the link 43 so tightly as to prevent slidable movement thereof to the extent permitted by its slotted pivot opening 42.

Each runner 21 is looped at its rearward portion 44 to avoid sharp and dangerous projections. The forward portion of each runner 21 is curved upwardly to meet the corresponding forward portion of the link 43, the lateral portion of the bumper bar 45, and the forward portion of one of the two arms 46 at a common pivotal juncture, effected by a rivet 47 for example. The rearward ends of the two arms 46 are pivotally joined along the midline of the sled by the rivet 48, which also passes through and pivotally joins the snow shield 49, the forward end of the steering lever 50, and the forward end of the under brace 51 at a common pivotal juncture. Both the under brace 51 and steering lever 50 are rigidly secured to the snow shield 49 by the rivet 52, and are pivotally secured to the deck 10 by the rivet 53 at essentially the middle of the cross brace 12.

As may be best seen in Fig. 2, the under brace 51 bends upward, from its pivotal attachment with the underside of the cross brace 12, toward its attachment at the under side of the snow shield 49 by the rivet 52, being spaced from the snow shield 49 by the washer 54 so as to clear the downward and inturned flange 55 around the periphery of the snow shield 49. From the rivet 52, the under brace 51 bends upward again to its pivotal attachment at the rivet 48 on the underside of the snow shield 49. Referring to Fig. 5, each of the two arms 46 extends upward and rearward from its pivotal attachment at one of the rivets 47 toward the rivet 48.

The snow shield 49 may be suitably formed as a sheet metal stamping or as a casting of a lightweight metal, such as an aluminum allow for example. By suitably forming reinforcing ribs within the snow shield 49, as for example the raised central rib 56, the two raised half cylindrical handle supporting portions 57, and the downward and inturned edge flange 55, the shield 49 may be constructed of relatively lightweight material without sacrificing the required rigidity or stiffness. The snow shield 49 overlies the arms 46 in an essentially horizontal plane surface at the level of the deck 10 and covers the forward portion of the sled to protect the rider from particles of snow and ice spray which are thrown upward by the runners 21 during coasting.

Both the rearward edge 58 of the shield 49 and the adjacent forward edge 59 of the deck 10 are arcuate about the pivot center 53, permitting pivoting of the shield 49 about the forward portion 59 of the deck 10 without materially affecting the spacing between the adjacent edges 58 and 59. The raised half cylindrical handle supporting portions 57 are formed integral with the shield 49 and provide reinforcements to which the tubular handle bars 60 are secured, as by welding, on the under side of the shield 49. Thus the structure readily lends itself to a decorative streamlined design, and the handle bars 60 may be conveniently disposed angularly to the longitudinal sled axis without breaking the smooth contours of the upper surface of the shield 49. The ends of the handle bars 60 are enclosed by the handle grips 61, preferably comprised of low thermal conductive plastic or rubber-like material.

It is apparent that the particular embodiment of the present invention may be modified by those skilled in the art without materially departing from the spirit of my invention. For example, the arcuate bumper bar 45 may assume other forms or may be elimintaed entirely. Upon elimination of the bumper bar 45, its function may be supplanted by the shield 49, which latter in that case may be supported by a pivotal attachment with the forward portions of the runners 21 by the rivets 47, as well as by the pivotal attachment at 48 with the steering lever 50. Such an arrangement would eliminate the rivet 52, the shield 49 being then movable laterally with the runners 21, but not pivotally about the rivet 53. To accommodate such lateral movement of the shield 49, the adjacent arcuate surfaces 58 and 59 would necessarily be modified and could be straight edges essentially transverse to the longitudinal axis of the sled, for example. Steering of the sled may then be effected by securing the steering handle bars 60 directly to the steering lever 50 as in conventional practice.

Similarly, other means of supporting the shield 49 at the front of the sled may be provided, but the embodiment shown in the drawings and which incorporates the shield 49 as an integral feature of the steering mechanism, is preferred as a simplified, economical and attractive construction, providing both safety and ease of operation for the rider.

In operation, it is readily observed that torque applied to the handle grips 61 is directed through the shield 49 so as to move the rivet 48 through an arc about the pivot axis provided by the rivet 53. The entire triangular structure comprising the two arms 46 and the bumper bar 45 is moved through the same arc and the forward portions of the runners 21 are flexed laterally.

The angular disposition of the steering handle bars 60 permits steering upon the application of the minimum force. In conventional coasting with sleds of the character described, the rider lies prone on the deck 10 with his hands grasping the grips 61 and his elbows bent at approximately 90 degree angles. In this position the axes of the forearms will lie along the axes of the handles 60, enabling the rider to pull and push on the grips 61 along their longitudinal axes and to direct his force from the relatively powerful shoulder muscles rather than from the biceps. The entire component of the force along the handle grips 61 will necessarily be available to pivot the snow shield 49 about its pivot 53.

The effective steering leverage provided by the structure shown, and its adaptation to the normal position of the body and arms of the rider during coasting so as to permit steering with a minimum of effort, is particularly noticeable in comparison with the steering of similar sleds utilizing a transverse steering bar, which as customarily employed extends across the sled and is rigidly secured to the steering lever 50. In such a case, pushing on one end of the transverse steering bar and pulling on the other end thereof develop a torque about the rigid connection between the transverse steering bar and the pivoted steering lever 50, with the result that a wobbly or broken connection exists after a short interval of normal use. Furthermore, the component of torque thus applied, which is available for pivoting the steering lever about the pivot axis corresponding to 53, is approximately only about three-quarters of the torque initially applied to the conventional transverse steering bar.

The tendency in steering with a transverse steering bar is to push or pull essentially perpendicularly to the ends thereof, utilizing the arm muscles, primarily the biceps, in flexing the elbows, but not employing the full power of the shoulders. Accordingly, by the construction shown in the present invention, not only is the applied steering torque most effectively utilized, but the steering is facilitated by disposing the steering arms 60 to conform to the customary body position assumed by the rider during coasting.

As the runners 21 are flexed in steering, the links 43 slide and pivot relative to the rivets 41, permitting the runners 21 to sweep through arcs in parallelism with each other about their fixed attachments to the rear knees 19. By virtue of the slotted pivot holes 42, effort is not required to flex the links 43, which will automatically slidably adjust themselves in steering. It is apparent that slots may also be provided for the holes of the forward pivots 47 where such is required.

Torque which would otherwise be developed in the forward knees 18 upon flexing the runners 21 during steering is avoided by means of the arcuate slots 31 which permit the knees 18 to pivot about the rivets 30. Pivoting of the knees 18 is also facilitated by virtue of the depressed portions 29 which minimize friction between the bench seats 23 and benches 14.

We have found that even in relatively rigidly constructed sleds, adequate bowing of the runners 21 for ordinary steering will result upon lateral flexing of the forward portions thereof, without providing for pivotal movement of the rear knees 19 or other portions of the rearward runner supports.

Furthermore, upon reducing the number of pivotal or sliding connections to the minimum consistent with customary steering requirements, and by avoiding play in the various junctures of the sled parts, the sturdiness and life of the sled will be materially increased. Accordingly, no provision is made to permit movement of the rear knees 19 except as permitted by their inherent resiliency. Slotted pivot holes are avoided at all pivotal junctures except as required at 28 and 42.

In accordance with the above specification and disclosures, we have provided a lightweight, sturdy and dependable sled which combines an improved structure with attractive design; which provides a snow shield integral with the steering mechanism with resultant safety, economies in construction and efficiency of operation; which provides adequate steering means operable with the minimum of effort utilizing a minimum of pivotal or sliding junctures; and which provides an improved knee of sturdy, lightweight and economical construction, cooperable with the steering means and providing the structural advantages of the arch in supporting the runners from the deck.

I claim:

1. In a sled having a pair of flexible longitudinal runners, a deck supported above said runners, rigid transverse benches affixed to the bottom of said deck, and knees disposed between said benches and said runners; a steering means for said sled comprising a snow shield pivotally secured to said deck, two spaced handle members rigidly secured to said snow shield, a pair of arms pivotally secured to said snow shield at one end and to the forward portion of said runners at the other end for flexing said runners upon the pivoting of said snow shield; downwardly extending rivets mounted in the forward bench and extending downwardly therefrom for engagement with arcuate slots provided in the top of the forward knees, and means for pivotally attaching said forward knees to said forward bench to permit pivotal movement thereof to the extent permitted by said arcuate slots, said snow shield comprising a plate having its upper surface lying in a common plane with the upper surface of the deck and having the rearward edge thereof extending immediately adjacent the forward edge of the deck in any pivotal position thereof relative to the deck to form a forward extension of the deck of the sled, the forward edge of said snow shield forming the forwardmost portion of said sled.

2. A sled as claimed in claim 1 and further characterized in that said snow shield is pivotally attached to said deck at a point intermediate the ends of said deck and in that the forward edge of said deck and rearward edge of said snow shield are adjacent each other along edges essentially concentric about the pivotal attachment of said snow shield with said deck.

CARL W. SUNDBERG.

REFERENCES CITED

The following references are of record in the file of this patent:

UNITED STATES PATENTS

| Number | Name | Date |
|---|---|---|
| 2,041,982 | Van Doren et al. | May 26, 1936 |
| 2,105,633 | Bowen | Jan. 18, 1938 |
| 2,123,486 | Mungen | July 12, 1938 |
| 2,243,345 | Kidder | May 27, 1941 |
| 2,247,033 | Oermann et al. | June 24, 1941 |
| 2,289,426 | Holbrook | July 14, 1942 |
| 2,446,452 | Benson | Aug. 3, 1948 |